United States Patent [19]

Kohda et al.

[11] Patent Number: 5,091,625
[45] Date of Patent: Feb. 25, 1992

[54] PLASMA ARC CUTTING DEVICE HAVING METAL DEPOSITION REMOVAL FUNCTION AND METHOD FOR REMOVING DEPOSITION FROM NOZZLE OF THE PLASMA ARC CUTTING DEVICE

[75] Inventors: Masahiro Kohda, Kakamigahara; Osamu Yamada, Niwa; Hisaaki Yamane, Kasugai, all of Japan

[73] Assignee: Brother Kogyo Kabushiki Kaisha, Japan

[21] Appl. No.: 653,300

[22] Filed: Feb. 11, 1991

[30] Foreign Application Priority Data

Feb. 16, 1990 [JP] Japan .................................. 2-37057
Feb. 19, 1990 [JP] Japan ............................. 2-15288[U]

[51] Int. Cl.$^5$ ............................................. B23K 9/00
[52] U.S. Cl. ........................... 219/121.44; 219/121.54; 219/121.39; 219/121.48; 219/121.59
[58] Field of Search ..................... 219/121.37, 121.39, 219/121.48, 137.43, 137.62, 136, 121.54, 121.59

[56] References Cited

U.S. PATENT DOCUMENTS

| | | | |
|---|---|---|---|
| 3,562,842 | 2/1971 | Turnipseed | 219/137.61 |
| 4,063,059 | 12/1973 | Brolund et al. | 210/121.39 |
| 4,280,043 | 7/1981 | Feix et al. | 219/137.43 |
| 4,702,195 | 10/1987 | Thielmann | 219/136 |

Primary Examiner—Mark H. Paschall
Attorney, Agent, or Firm—Oliff & Berridge

[57] ABSTRACT

A plasma arc workpiece cutting device having means for removing a deposited material deposited onto a nozzle of a plasma torch. During plasma arc cutting operation, molten spatters may be directed toward the plasma torch and may be adhered onto the nozzle. The deposited material is removed by way for removing the deposited material. At every proper intervals, the plasma torch is moved toward the removing structure, and the deposited material is brought into sliding contact therewith in order to frictionally remove the deposited material from the nozzle. A control system is provided for moving the plasma torch at every proper timings so as to perform the deposited material removing operation.

19 Claims, 6 Drawing Sheets

PLASMA ARC CUTTING DEVICE HAVING METAL DEPOSITION REMOVAL FUNCTION AND METHOD FOR REMOVING DEPOSITION FROM NOZZLE OF THE PLASMA ARC CUTTING DEVICE

BACKGROUND OF THE INVENTION

The present invention relates to a plasma arc cutting device having means for removing a deposition from a plasma arc nozzle, and to a method for removing the deposition from the nozzle.

A plasma arc cutting device is well known in the art in which a metallic or non-metallic workpiece is locally melted and cut by a heat energy of the plasma arc passing through a plasma arc nozzle. In a conventional plasma arc cutting method, a through hole is formed in a plate like workpiece as a starting hole by the ejection of the plasma arc on the workpiece, and thereafter, linear cutting starting from the starting hole is carried out by the plasma arc.

As shown in FIG. 1(a), the plasma arc cutting device is provided with a nozzle 22, through which a main plasma arc 1 is passed. Within the nozzle 22, an electrode 21 is provided for generating the plasma arc 1. Apparently, the workpiece W and the electrode 21 are connected to a power source for generating the main plasma arc 1 between a tip end of the electrode 21 and the surface of the workpiece W. An annular space is provided between the electrode 21 and the nozzle 22.

For forming the starting hole in the workpiece W, material of the workpiece W melted by the plasma arc 1 is splashed as spatters 2 since the melted material cannot be directed to a proper location. Parts of the spatters may be reflected on the surface of the workpiece W, and are directed upwardly to the nozzle 22. The reflected molten material may be deposited on the nozzle 22, and the deposition may be largely grown as shown in FIG. 2(b). If this deposition is grown to a certain mass, another arc 4 between the electrode 1 and the nozzle 22 and arc 5 between the deposition 3 and the workpiece W are generated in addition to the main arc plasma 1. Such plurality of arcs may degrade the workpiece cutting efficiency and may deteriorate the cutting contours in the workpiece.

If the deposition 3 is further grown to reach the workpiece W, the main plasma arc 1 may disappear, and large internal plasma arc 6 may be generated between the electrode 21 and the nozzle 22 as shown in FIG. 1(c). This internal plasma arc 6 may deteriorate the nozzle 22.

According to the conventional plasma arc cutting device, however, no particular attention is drawn to such a deposition 3 onto the nozzle 22. An operator is, therefore, obliged to manually remove the deposition by using a file, etc. Such manual removal of the deposited material 3 may be troublesome. Particularly, if the plasma arc cutting device is operated under Numerical Control (NC) in which the device is automatically operated, the working efficiency may be extremely lowered if monitoring the state of the deposited material and if intermittently breaking off the cutting operation for conducting the manual operation in order to manually remove the deposited material.

SUMMARY OF THE INVENTION

It is therefore, an object of the present invention to overcome the above described drawbacks and disadvantages and to provide an improved apparatus and method for automatically removing the materials deposited on the nozzle.

Another object of the invention is to provide an improved plasma arc cutting device and method for removing the deposition in which inadvertent surplus arcing is avoidable by properly removing the material deposited on the nozzle.

These and other object of the present invention will be attained by providing a plasma arc cutting device for cutting a workpiece with a plasma arc comprising: a table for mounting the workpiece thereon, a plasma torch comprising a gas supply nozzle and an electrode for generating a plasma arc jet toward the workpiece, moving means for relatively moving the plasma torch with respect to the table, a plasma arc power supply unit connected to the plasma torch for supplying electrical current thereto to thereby provide the plasma arc between the electrode and the workpiece, means for removing a material deposited on the nozzle therefrom, the deposited material removing means being provided on the table, the plasma torch being movable toward and away from the removing means, and control means for controlling movement of the moving means for controlling relative position between the plasma torch and the workpiece, the control means having means for executing movement of the moving means at an interval so as to position the plasma torch in confrontation with the removing means to thereby remove the deposited material from the nozzle.

In another aspect, in accordance with the present invention there is provided a method for removing a material deposited onto a nozzle of a plasma torch in a plasma arc cutting device, the device including a table for mounting a workpiece thereon, the plasma torch comprising a gas supply nozzle and an electrode for generating a plasma arc jet toward the workpiece, moving means for relatively moving the plasma torch with respect to the table, and a plasma arc power supply unit connected to the plasma torch for supplying electrical current thereto to thereby provide the plasma arc between the electrode and the workpiece, the method comprising the steps of: providing a means on the table for removing the deposited material from the nozzle; intermittently moving the plasma torch toward the deposition removing means, and sliding the deposited material with respect to the removing means so as to frictionally remove the deposited material from the nozzle.

In accordance with the present invention, the deposited material can be removed at every proper intervals even during the exact workpiece cutting operation. Therefore, the deposited material can be partly or entirely removed from the nozzle before the deposition largely grows.

DETAILED DESCRIPTION OF THE PREFERRED EMBODIMENT

A plasma arc cutting device according to one embodiment of this invention will be described below with reference to accompanying drawings.

Figure 1A:
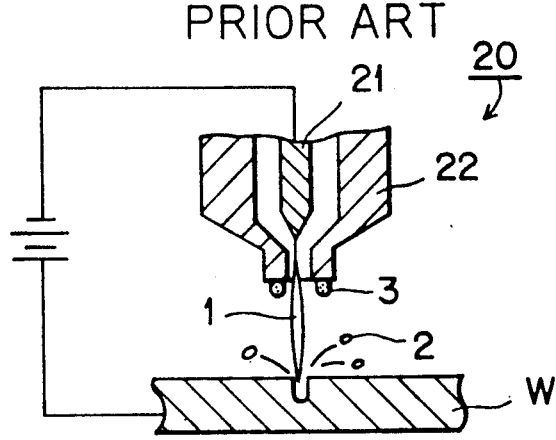
FIGS. 1(a) through (c) are schematic cross-sectional views for description of material deposition into a nozzle in a conventional plasma arc cutting device.
Figure 1B:
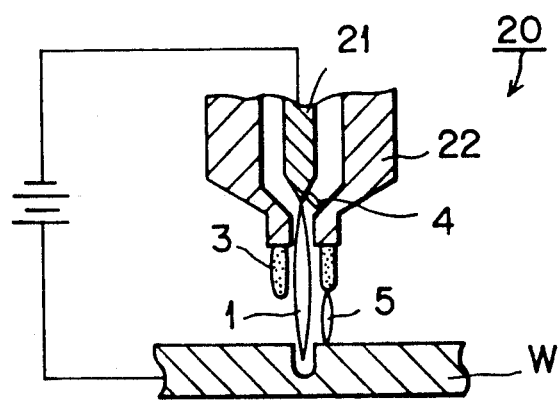
Figure 1C:
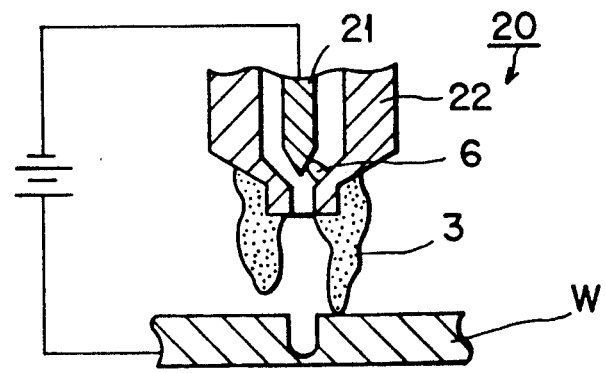
Figure 2:
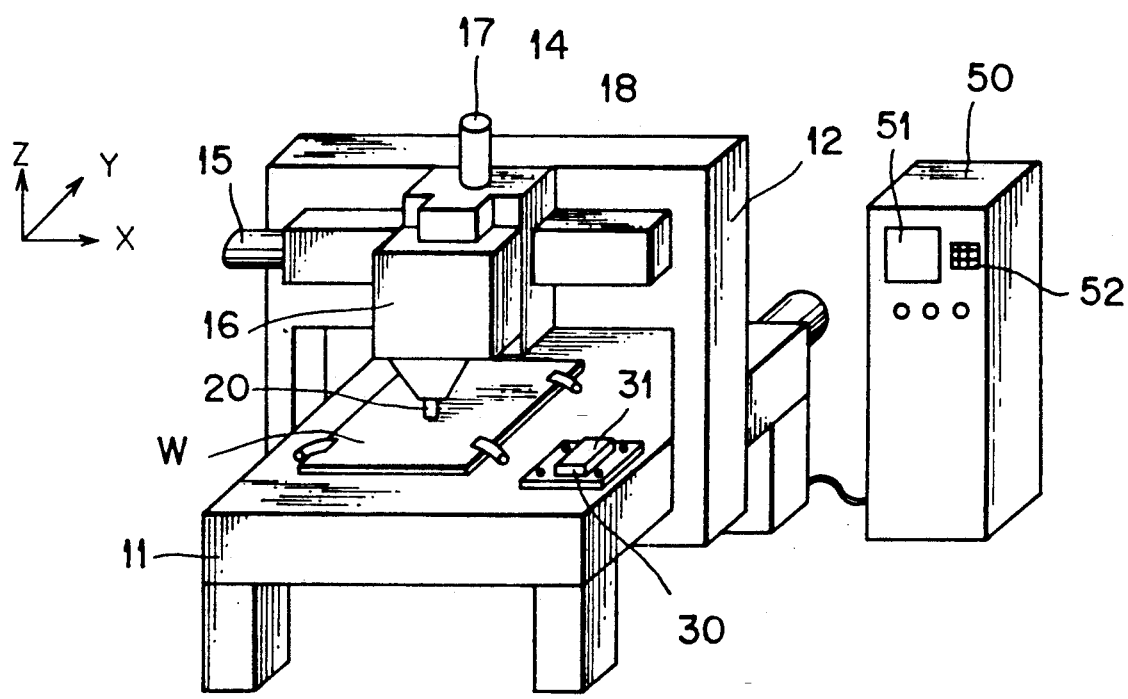
FIG. 2 is a perspective view showing a plasma arc cutting device according to one embodiment of the present invention.

In FIG. 2, the plasma arc cutting device has a gate or arch shaped movable frame 12 movable in one horizontal direction (Y direction) relative to a stationary table 11 on which a workpiece W is mounted. A Y-axis motor 13 is supported on the table 11 for moving the movable frame 12 in Y direction. On the movable frame 12, a horizontally extending guide member 18 is fixed, and a saddle member 14 is movably supported on the guide member 18. The saddle member 14 is movable in a horizontal direction (X direction) perpendicular to the Y direction. A X-axis motor 15 is fixedly supported on the movable frame 12 for moving the saddle member 14 along the guide 18. On the saddle member 14, a head 16 is movably supported. The head 16 is vertically movable (Z direction) by a Z-axis motor 17 fixedly supported on an upper end face of the saddle member 14.

The head 16 has a tip end portion provided with a plasma torch 20 which is positioned in confrontation with the workpiece W mounted on the table 11. The plasma torch 20 is adapted for ejecting a plasma arc which are to be directed on the workpiece W. Further, a friction unit 30 having a friction surface 31 is fixed on the table 11. A tip end portion of the plasma torch 20 can be brought into sliding contact with the friction surface 31.

Figure 3:
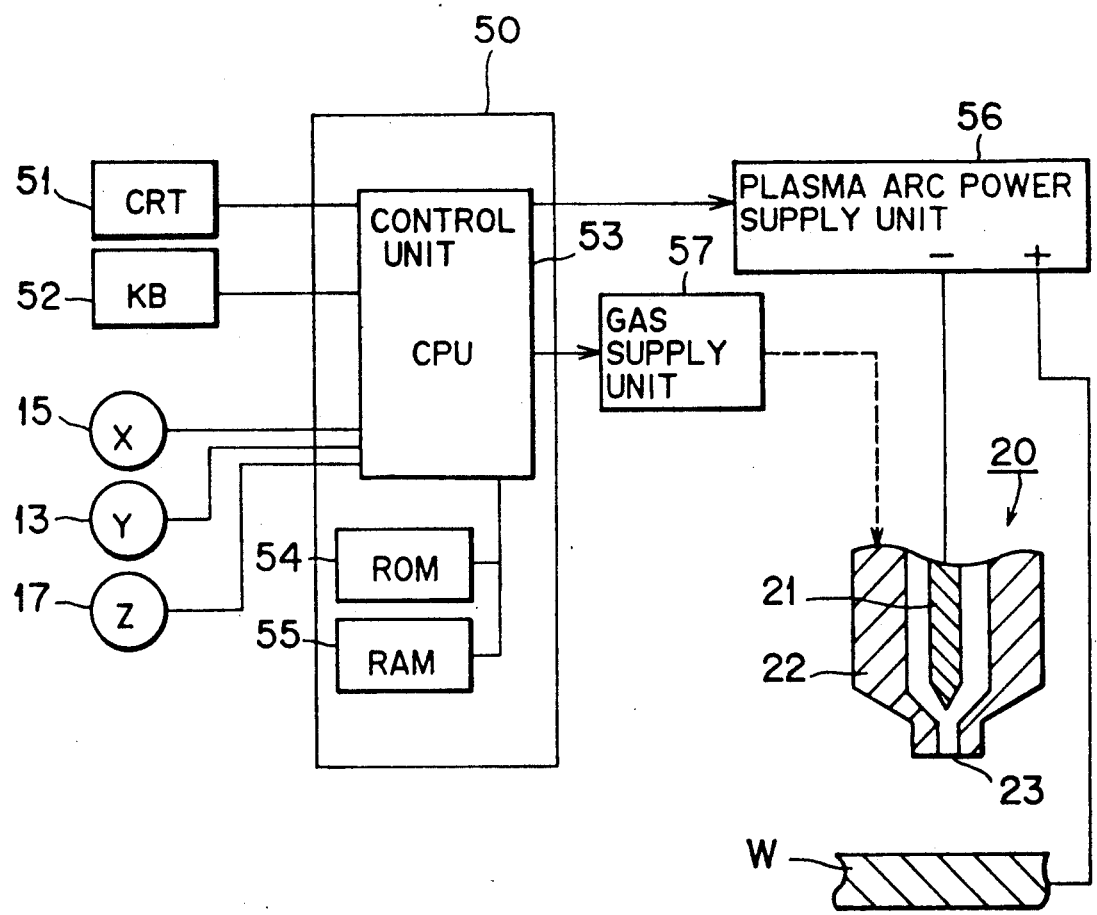
FIG. 3 is a block diagram showing electrical circuit for automatic control to the plasma arc cutting device of the present invention.

As shown in FIG. 3, the Y-axis motor 13, the X-axis motor 15, the Z-axis motor 17 and a torch 20 are connected to a control unit 50. Further, a CRT display 51 and a keyboard 52 are also connected to the control unit 50. The control unit 50 includes a computer having a central processing unit (CPU) 53, a ROM 54 and a RAM 55. By the manipulation to the keyboard 52, the X-axis motor 15, the Y-axis motor 13 and the Z-axis motor 17 are controlled, and the cutting operation is observed by the CRT display 51.

The CPU 53 is connected to a plasma arc power supply unit 56 and a gas supply unit 57 for their controls. The plasma arc power supply unit 56 is connected to a commercial power source, and generates a direct current or pulsating current in accordance with a command from the CPU 53, which current is supplied to an electrode 21 of a plasma torch 20. The gas supply unit 57 is adapted for supplying a gas such as oxygen to the plasma torch 20.

The plasma torch 20 has the nozzle 22 formed of a copper, and the electrode 21 deposed within an internal space of the nozzle 22. The nozzle 22 defines an ejection opening 23 through which the oxygen gas from the gas supply unit 57 is ejected toward the workpiece W. A positive terminal of the plasma arc power supply unit 56 is connected to the workpiece W whereas a negative terminal of the unit 56 is connected to the electrode 21. The plasma arc generated between the electrode 21 and the workpiece W is grown to a plasma jet by the gas blown through the nozzle 22, and the plasma jet is applied to the workpiece W.

Figure 4:
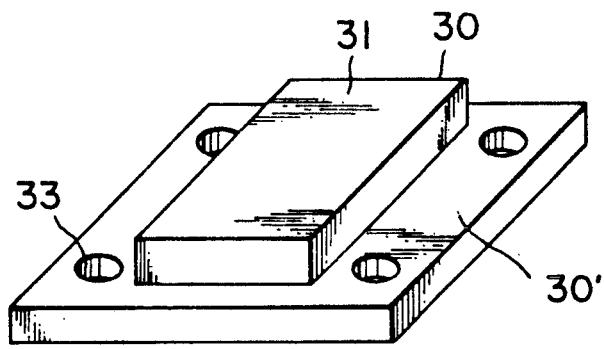
FIGS. 4 to 6 and FIG. 8 are perspective views showing examples of friction units for removing the deposited material, the unit being usable in the embodiment of this invention.

FIG. 4 shows one example of the friction unit 30. The unit includes a flat grinding stone 31 as the friction member fixedly secured to a base 30'. The friction unit 30 is formed with bores 33 through which bolts extend to fix the friction unit 30 to the table 11. Instead of the grinding stone, a sand paper (not shown) can merely be attached on the table 11.

Figure 5:
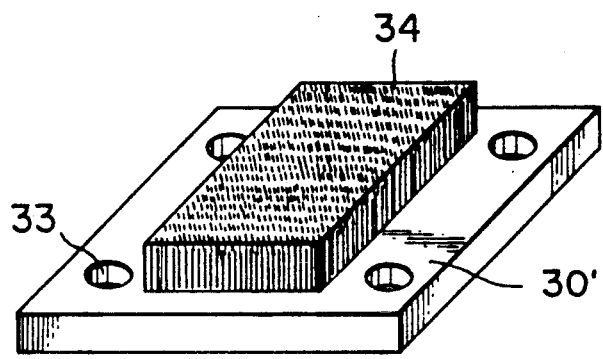

FIG. 5 shows another example of a friction unit. The friction unit includes vertically orienting wire brush 34 implanted on the base 30'.

Figure 6:
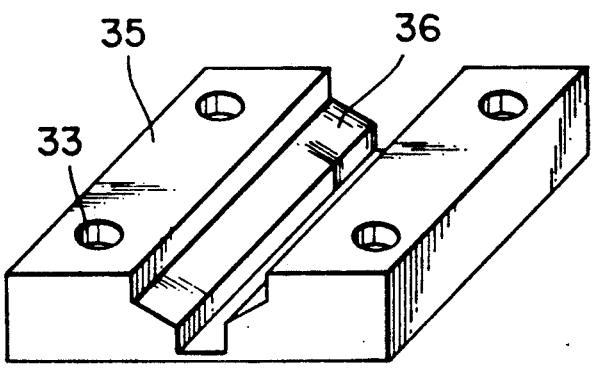

FIG. 6 shows still another example of a friction unit 35. The unit is of a block configuration and is made of steel. The unit 35 is formed with a linear groove 36 whose cross-sectional contour is identical with a cross-sectional contour of the nozzle 22 provided at the tip end portion of the plasma torch 20. When the nozzle 22 is aligned with the groove 36, and runs therealong, any material deposited on the nozzle 22 is removable. In this connection, the groove 36 serves as a friction surface with which the nozzle 22 is in sliding contact.

Figure 7:
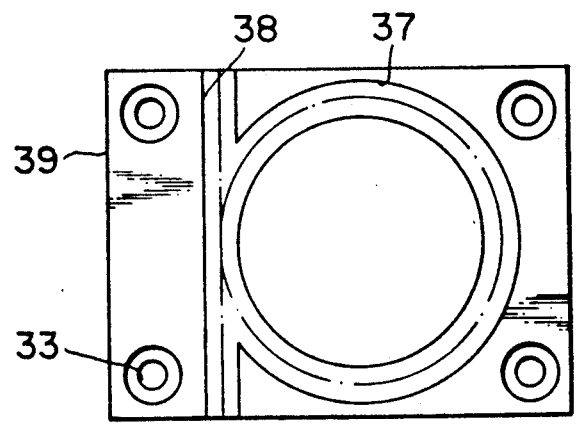
FIG. 7 is a plan view showing another example of a friction unit for removing the deposited material.

FIG. 7 shows still another example of a block like friction unit 39. This unit is formed with a groove 38 having a cross-sectional configuration the same as that of the groove 36 shown in FIG. 6. However, the groove 38 includes a linear section and a circular section 37 tangentially contiguous with the linear section. By moving the nozzle 22 along the full circle of the circular groove 37, material deposited on an outer peripheral surface of the nozzle 22 can be removed therefrom.

Figure 8:
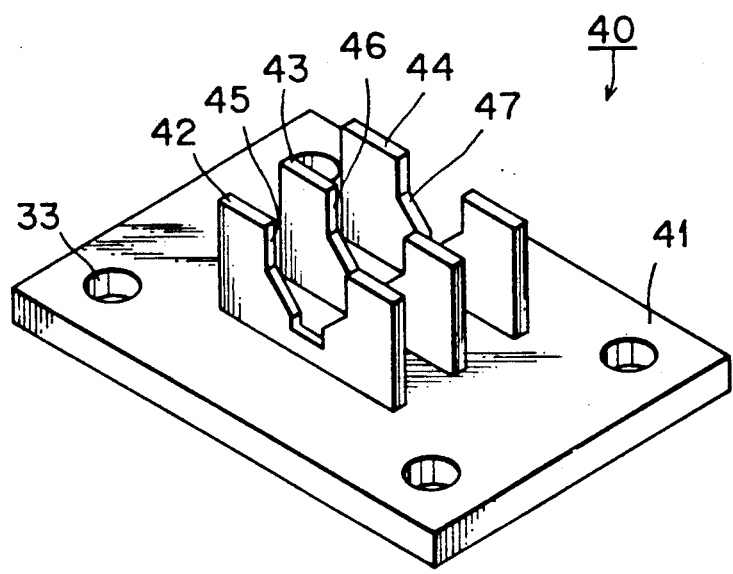
Figure 9:
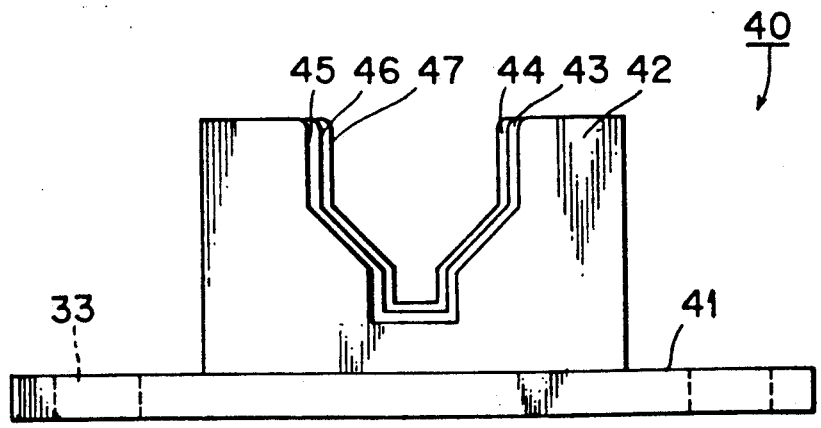
FIG. 9 is a front view showing the example of the friction unit shown in FIG. 8.

FIGS. 8 and 9 show still another example of a friction unit 40. The unit 40 includes a base 41 and a plurality of upstanding plates 42, 43 and 44 those extending from the base 41. The plates 42, 43 and 44 are formed with notches 45, 46 and 47, respectively each having configuration analogous to the cross-sectional configuration of the nozzle 22. Here, as best shown in FIG. 9, the first notch 45 which is adapted to first allow the nozzle to pass therethrough has the largest configuration, so that the largest gap is provided between the first notch 45 and the nozzle 22. The gap is gradually reduced, so that the last notch 47 has a configuration to permit the nozzle 22 to slidingly move with respect thereto. With this structure, the largely bulged or protruded deposited material is chipped off from the nozzle 22, when the latter is passed through the first notch 45, and the deposited material is gradually removed orderly when the nozzle 22 is passed through the second and the last notches 46 and 47.

Figure 10:
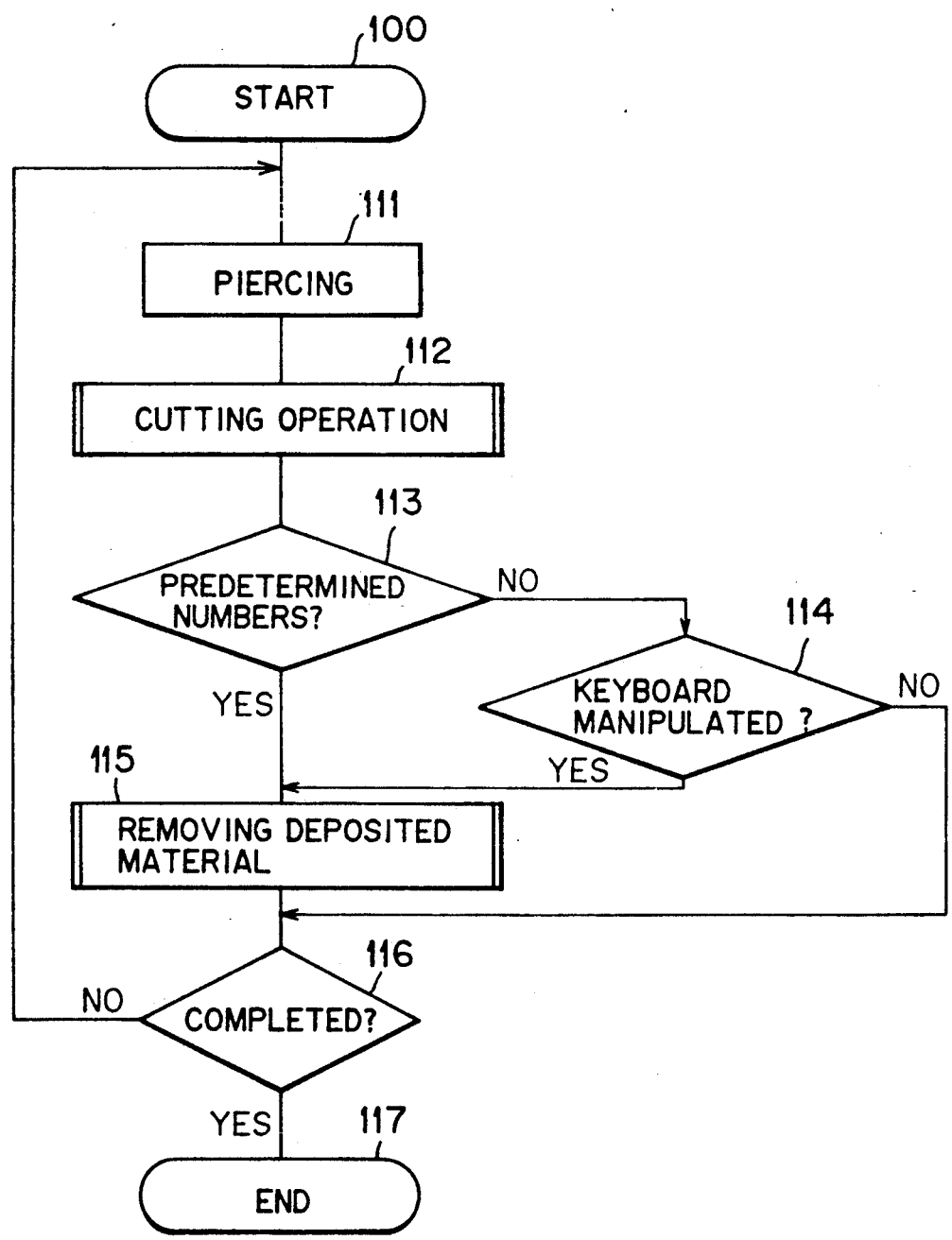
FIG. 10 is a flowchart for description of sequential control to remove the deposited material according to one embodiment of this invention.

An operational routine controlled by the control unit 50 will next be described with reference to FIG. 10. In step 100, a processing is started. At this time, initial setting, working data read-out etc. are executed. Then, in Step 111, the plasma arc power supply unit 56 and the gas supply unit 57 are operated for forming the starting hole i,e, piercing is carried out. Upon completion of the piercing, the routine proceeds into Step 112 where cutting to the workpiece W is carried out. In this cutting process, the X-axis motor 15 and the Y-axis motor 13 are driven in accordance with operational program stored in the RAM 55, so that the workpiece W is cut into a desired configuration.

When the sequential cutting operation is completed, the routine proceeds into Step 113 in which investigated is the already executed numbers of formations of the starting holes. If the numbers reaches a predetermined numbers such as seven times, the routine proceeds into Step 115, and if the numbers does not reaches the predetermined numbers, the routine proceeds into Step 114. In Step 114, judgment is made as to whether or not the instruction indicative of the removal of the deposited material from the nozzle 22 is issued from the keyboard 52. If the judgment falls Yes, i.e., the instruction has already been issued, the routine proceeds into Step 115, and if the judgment falls No, the routine proceeds into Step 116.

In the Step 115, the CUP 53 sends an output signal to the motors 13, 15 and 17 so as to move the plasma torch 20 away from the workpiece W and to direct the torch 20 toward a position immediately above the friction unit 30 in order to carry out the removal of the material deposited on the nozzle 22 therefrom. The head 16 is then moved downwardly by operating the Z-axis motor 17, and thereafter, the plasma torch 20 is further moved by operating the X-axis motor 15 and the Y-axis motor 13 so that the nozzle 22 can be brought into sliding contact with or into close access to the friction surface 31 of the friction unit 30. As a result, the material 3 deposited on the nozzle 22 can be brought into sliding contact with the friction surface 31 so as to frictionally remove the deposited material from the nozzle 22. When the removal work of the deposited material is completed, the routine proceeds into Step 116 where judgment is made as to whether or not the workpiece cutting operation is finished. If No, the routine returns back to Step 111 and the above described proceedings are again repeated. On the other hand, if the cutting operation with respect to the workpiece W is already finished, the routine goes to Step 117 to end the process.

In the above described process, the control unit 50 and the keyboard 52 serve as signal generating means for generating deposited material removing signal in association with the executed Step 113 and Step 114 in accordance with the completion of the predetermined working, such as completion of the predetermined times of formations of the starting holes, and in accordance with the manipulation to the keyboard 52. Further, the control unit 50 serves as instruction means for instructing a start of the deposited material removing operation from the nozzle 22 in response to the deposited material removing signal generated at the Step 113 or Step 114. By means of the instruction means, the X-, Y- and Z-axis motors 15, 13 and 17 are controlledly rotated so that the nozzle 22 provided at the tip end portion of the plasma torch 20 is brought into sliding contact with or brought into a position immediately adjacent to the friction surface 31, 34, 36, 37, 38, 45, 46 or 47 of the friction unit 30, 34, 35, 39 or 40, to thereby remove the deposited material from the nozzle 22.

In the above described embodiment, the numbers of formations of the starting holes is counted, and if the counted numbers reaches the predetermined numbers, the deposited material removing signal is generated, i.e, the deposited material removing operation is started. However, the deposited material removing operation can also be started by the other factors. For example, cumulation is made with respect to total period for the exact formation of the starting holes and cutting operation, and the exact accumulated period is compared with a predetermined period for the judgment of the start of the deposited material removal work. Alternatively, the working distance is cumulatively stored into RAM and the cumulated distance is compared with a predetermined distance for the judgment of the start. Further alternatively, at every replacement of the workpiece W, the replacement times is counted, for example, the operation start signals are counted, and if the counted numbers reaches a predetermined numbers, the routine goes into Step 115. In still further alternative, a predetermined voltage is set in the RAM, and if an exact voltage between the nozzle 22 and the pate like workpiece W is lowered to the predetermined voltage, the routine can goes into the Step 115.

As described above, in the present invention, the material deposited onto the tip end of the plasma torch can be automatically removed therefrom. Therefore, generation of double arcing is avoidable. Accordingly it is unnecessary for an operator to continuously monitor the exact piercing or cutting state to the workpiece, and stabilized automatic plasma arc cutting operation is attainable without destruction of the nozzle or the plasma torch.

While the invention has been described in detail and with reference to specific embodiment thereof, it would be apparent to those skilled in the art that various changes and modifications may be made therein without departing from the spirit and scope of the invention.

What is claimed is:

1. A plasma ac cutting device for cutting an electrically conductive workpiece with a plasma arc comprising:
    a table for mounting the workpiece thereon;
    a plasma torch comprising a gas supply nozzle and an electrode for generating a plasma arc jet toward the workpiece, the plasma arc contacting the workpiece;
    moving means for relatively moving the plasma torch with respect to the table;
    a plasma arc power supply unit connected to the plasma torch for supplying electrical current thereto to thereby provide the plasma arc between the electrode and the workpiece;
    means for removing a material deposited on the nozzle therefrom, the deposited material removing means being stationary and fixed to the table, the plasma torch being movable toward and away from the removing means, and
    control means for controlling movement of the moving means for controlling relative position between the plasma torch and the workpiece, the control means having means for executing movement of the moving means at a predetermined interval so as to position the plasma torch in confrontation with the removing means to thereby remove the deposited material from the nozzle and timing means for determining the interval.

2. The plasma arc cutting device as claimed in claim 1, wherein the execution means comprises:
    a signal generating means for generating a signal indicative of a removal of the deposited material in response to the interval determined by the timing means;
    instruction means for instructing the start of the deposited material removing operation in response to the signal so as to move the moving means to permit the plasma torch to move toward the removing means.

3. The plasma arc cutting device as claimed in claim 1, wherein the removing means comprises a base fixedly secured to the table, and a flat grinding stone secured to the base, the grinding stone serving as a friction surface, the deposited material being in sliding contact with the friction surface upon movement of the moving means.

4. The plasma arc cutting device as claimed in claim 2, wherein the removing means comprises a base fixedly secured to the table, and a flat grinding stone secured to the base, the grinding stone serving as a friction surface, the deposited material being in sliding contact with the friction surface upon movement of the moving means.

5. The plasma arc cutting device as claimed in claim 1, wherein the removing means comprises a friction block fixed to the table, the friction block being formed with a linear groove having a cross-sectional configuration identical with a cross-sectional configuration of the plasma torch, a surface of the groove serving as a friction surface and the deposited material being in sliding contact with the friction surface upon movement of the moving means.

6. The plasma arc cutting device as claimed in claim 2, wherein the removing means comprises a friction block fixed to the table, the friction block being formed with a linear groove having a cross-sectional configuration identical with a cross-sectional configuration of the plasma torch, a surface of the groove serving as a friction surface and the deposited material being in sliding contact with the friction surface upon movement of the moving means.

7. The plasma arc cutting device as claimed in claim 1, wherein the removing means comprises a friction block fixed to the table, the friction block being formed with a linear groove and a circular groove tangentially provided relative to the linear groove, surface of the linear groove and the circular groove serving as a friction surface and the deposited material being in sliding contact with the friction surface upon movement of the moving means.

8. The plasma arc cutting device as claimed in claim 2, wherein the removing means comprises a friction block fixed to the table, the friction block being formed with a linear groove and a circular groove tangentially provided relative to the linear groove, surface of the linear groove and the circular groove serving as a friction surface and the deposited material being in sliding contact with the friction surface upon movement of the moving means.

9. The plasma arc cutting device as claimed in claim 1, wherein the removing means comprises a base fixedly secured to the table, and a plurality of plates vertically extending from the base and arrayed linearly, each of the plurality of plates being formed with a notch having a configuration analogous to a cross-sectional configuration of the plasma torch, a size of a precedent notch being greater than a subsequent notch, so that a gap between a notch and the plasma torch is gradually reduced toward the subsequent notch in accordance with the movement of the plasma torch over the plurality of plates, faces of the notches serving as friction surfaces.

10. The plasma arc cutting device as claimed in claim 2, wherein the removing means comprises a base fixedly secured to the table, and a plurality of plates vertically extending from the base and arrayed linearly, each of the plurality of plates being formed with a notch having a configuration analogous to a cross-sectional configuration of the plasma torch, a size of a precedent notch being greater than a subsequent notch, so that a gap between a notch and the plasma torch is gradually reduced toward the subsequent notch in accordance with the movement of the plasma torch over the plurality of plates, faces of the notches serving as friction surfaces.

11. The plasma arc cutting device as claimed in claim 1, further comprising manual timing determination means for invalidating the interval determined by the timing means and for outputting a signal to the control means in order to execute a removal of the deposited material on a basis of a manually determined timing.

12. A method for removing a material deposited onto a nozzle of a plasma torch in a plasma arc cutting device, the device including a table for mounting an electrically conductive workpiece thereon, the plasma torch comprising a gas supply nozzle and an electrode for generating a plasma arc jet toward the workpiece, the jet contacting the workpiece, moving means for relatively moving the plasma torch with respect to the table, and a plasma arc power supply unit connected to the plasma torch for supplying electrical current thereto to thereby provide the plasma arc between the electrode and the workpiece, the method comprising the steps of:

providing a stationary means fixed on the table for removing the deposited material from the nozzle;

determining an interval of movement of the plasma torch;

intermittently moving the plasma torch toward the deposition removing means based on the determined interval of movement; and sliding the deposited material with respect to the removing means so as to frictionally remove the deposited material from the nozzle.

13. The method for removing the deposited material from the nozzle of the plasma torch as claimed in claim 12 wherein the interval determination step comprises the steps of:

generating a signal indicative of a removal of the deposited material in response to a given result; and instructing a start of the deposited material removing operation in response to the signal so as to move the moving means to permit the plasma torch to move relative to the removing means.

14. The method as claimed in claim 13, wherein the given result comprises a result of comparison of a predetermined stored numbers with an actual numbers of formations of starting holes to be formed in workpieces, the signal being generated when the actual numbers reaches the predetermined stored numbers.

15. The method as claimed in claim 13, wherein the given result comprises a result of comparison of a predetermined stored period with actual cumulative period for performing starting hole forming operation and cutting operation with respect to a workpiece, the signal being generated when the actual cumulative period reaches the predetermined stored period.

16. The method as claimed in claim 13, wherein the given result comprises a result of comparison of a predetermined stored distance with actual working distance for cutting a workpiece, the signal being generated when the actual working distance reaches the predetermines stored distance.

17. The method as claimed in claim 13, wherein the given result comprises a result of comparison of a predetermined stored numbers with actual numbers of replacing workpieces, the signal being generated when the actual numbers reaches the predetermined stored numbers.

18. The method as claimed in claim 13, wherein the given result comprises a result of comparison of a predetermined stored voltage with actual voltage between the nozzle and the workpiece, the signal being generated when the actual voltage is reduced to the predetermined stored voltage.

19. A plasma arc cutting device for cutting an electrically conductive workpiece with a plasma arc comprising:

a table for mounting the workpiece thereon;

a plasma torch comprising a gas supply nozzle and an electrode for generating a plasma arc jet toward the workpiece, the plasma arc contacting the workpiece;

moving means for relatively moving the plasma torch with respect to the table;

a plasma arc power supply unit connected to the plasma torch for supplying electrical current thereto to thereby provide the plasma arc between the electrode and the workpiece;

means for removing a material deposited on the nozzle therefrom, the deposited material removing means being provided on the table, the plasma torch being movable toward and away from the removing means, the removing means comprising a base fixedly secured to the table and a flat grinding stone secured to the base, the grinding stone serving as a friction surface and the deposited material slidingly contacting the friction surface upon movement of the moving means; and control means for controlling movement of the moving means for controlling relative position between the plasma torch and the workpiece, the control means having means for executing movement of the moving means at an interval so as to position the plasma torch in confrontation with the removing means to thereby remove the deposited material from the nozzle.

* * * * *